US011195642B2

(12) United States Patent
Dietlein et al.

(10) Patent No.: US 11,195,642 B2
(45) Date of Patent: Dec. 7, 2021

(54) SYSTEM AND METHOD FOR THE AUTOMATED PRODUCTION OF A CABLE SET

(71) Applicant: LEONI Bordnetz-Systeme GmbH, Kitzingen (DE)

(72) Inventors: Fabian Dietlein, Neustadt/Aisch (DE); Christian Guni, Kitzingen (DE); Paul Heisler, Amberg (DE); Roland Jaecklein, Volkach (DE); Paulo Martins, Kitzingen (DE); Onur Tavsel, Wuerzburg (DE)

(73) Assignee: LEONI Bordnetz Systeme GmbH, Kitzingen (DE)

( * ) Notice: Subject to any disclaimer, the term of this patent is extended or adjusted under 35 U.S.C. 154(b) by 152 days.

(21) Appl. No.: 16/604,337

(22) PCT Filed: Apr. 9, 2018

(86) PCT No.: PCT/EP2018/059016
§ 371 (c)(1),
(2) Date: Oct. 10, 2019

(87) PCT Pub. No.: WO2018/189102
PCT Pub. Date: Oct. 18, 2018

(65) Prior Publication Data
US 2020/0161025 A1  May 21, 2020

(30) Foreign Application Priority Data

Apr. 10, 2017 (DE) .................... 10 2017 206 139.1

(51) Int. Cl.
*H01B 13/012* (2006.01)
*B25J 11/00* (2006.01)
(Continued)

(52) U.S. Cl.
CPC ...... *H01B 13/01236* (2013.01); *B25J 11/005* (2013.01); *B60R 16/0207* (2013.01);
(Continued)

(58) Field of Classification Search
CPC ......... H01B 13/01236; H01B 13/01209; B25J 11/005; H01R 43/20
See application file for complete search history.

(56) References Cited

U.S. PATENT DOCUMENTS 4,559,702 A   12/1985 Maack et al.
5,083,369 A    1/1992 Cerda
(Continued)

FOREIGN PATENT DOCUMENTS

CN      104094726 A  * 10/2014
DE       33 27 583 A1    2/1985
(Continued)

*Primary Examiner* — Peter Dungba Vo
*Assistant Examiner* — Jose K Abraham
(74) *Attorney, Agent, or Firm* — Muncy, Geissler, Olds & Lowe, P.C.

(57) ABSTRACT

A system for the automated production of a cable set, which has a branched structure of a plurality of individual line elements. In a modular set-up in the first part, a plurality of first processing stations, and in the second part, a plurality of second processing stations are arranged. In the first part, there is an automatic preparation of the individual line elements, which are then collected in a buffer station at the end of the first part. In the second part, the prepared individual line elements are assembled into the cable set. The line elements are plugged into connector casings in a connector station and transferred to second transporters, and via which the branched structure of the cable set is then formed by moving along second tracks. In this spread-out branched structure, a fixing of the line elements to one another takes place in a fixing station.

22 Claims, 11 Drawing Sheets

(51) Int. Cl.
    *H01R 43/20* (2006.01)
    *B60R 16/02* (2006.01)
    *H01B 7/00* (2006.01)

(52) U.S. Cl.
    CPC ..... *H01B 7/0045* (2013.01); *H01B 13/01209* (2013.01); *H01R 43/20* (2013.01)

(56) References Cited

U.S. PATENT DOCUMENTS

| | | | |
|---|---|---|---|
| 5,309,633 A | | 5/1994 | Ricard |
| 5,471,741 A | | 12/1995 | Heisner et al. |
| 5,655,293 A | | 8/1997 | Celoudoux et al. |
| 5,745,975 A | * | 5/1998 | Heisner ................ H01R 43/28 29/33 M |
| 5,913,469 A | * | 6/1999 | Suzuki ................ B65H 51/12 226/36 |
| 6,260,267 B1 | * | 7/2001 | Ohta ................ H01R 43/01 29/747 |
| 10,068,680 B2 | | 9/2018 | Mueller |
| 2002/0144395 A1 | * | 10/2002 | Soriano ................ H01R 43/20 29/747 |
| 2003/0100228 A1 | * | 5/2003 | Bungo ................ H01R 43/20 439/701 |
| 2005/0229390 A1 | * | 10/2005 | Romagnoli ............ B65H 49/32 29/748 |
| 2016/0285221 A1 | * | 9/2016 | Pechter ................ H01R 43/20 |
| 2017/0162294 A1 | * | 6/2017 | Mueller ................ H01B 13/228 |
| 2018/0075951 A1 | * | 3/2018 | Maki ................ B23P 21/00 |

FOREIGN PATENT DOCUMENTS

| | | | |
|---|---|---|---|
| DE | 38 20 638 A1 | | 12/1993 |
| DE | 690 12 221 T2 | | 12/1994 |
| DE | 10 2015 214 929 A1 | | 2/2017 |
| EP | 0 145 216 A2 | | 6/1985 |
| EP | 0 661 721 A1 | | 7/1995 |
| EP | 2 814 042 A1 | | 12/2014 |
| JP | H 05-234659 A | | 9/1993 |
| JP | 2004158308 A | * | 6/2004 |
| WO | WO 02/089267 A1 | | 11/2002 |
| WO | WO-02089267 A1 | * | 11/2002 ............ H01R 43/28 |
| WO | WO 2015/055753 A1 | | 4/2015 |
| WO | WO 2016/026711 A1 | | 2/2016 |
| WO | WO 2016/158339 A1 | | 10/2016 |

* cited by examiner

SYSTEM AND METHOD FOR THE AUTOMATED PRODUCTION OF A CABLE SET

This nonprovisional application is a National Stage of International Application No. PCT/EP2018/059016, which was filed on Apr. 9, 2018, and which claims priority to German Patent Application No. 10 2017 206 139.1, which was filed in Germany on Apr. 10, 2017 and which are both herein incorporated by reference.

BACKGROUND OF THE INVENTION

Field of the Invention

The present invention relates to a system and a method for the automated production of a cable set, in particular for a motor vehicle.

Description of the Background Art

A cable set generally includes a plurality of individual line elements, which are connected to each other. The line elements are in particular insulated conductors, twisted conductors (pairs), optical waveguides or prefabricated sublines, such as sheathed cables. An insulated conductor is generally understood to be a conductor surrounded by insulation, either a conductor wire or a stranded conductor. A respective cable set has a branched structure, which corresponds to a future laying structure, for example, within a motor vehicle or in any other system. A branched structure is understood here to mean that individual line elements branch off from a main line at different locations of the cable set. Normally, in an assembled cable set, connectors or other contact elements are fastened to the ends of at least at some of the line elements.

The production and handling of such cable sets is expensive. Especially in the automotive industry there are—even in a same motor vehicle model—a variety of different types of cable sets due to different features and those that are individually customizable by the customer. Normally, a cable set for a motor vehicle configured individually by the customer is only produced after the customer has placed the order. Due to the short delivery times desired, the fastest possible production of a customized individual cable set is desired.

Due to the large variety of types and variations of these individual cable sets, automating the production of such cable sets is difficult, which is why until today the production of cable sets especially for the automotive industry continues to require a high amount of manual work. Typically, the individual line elements are laid manually along so-called harness boards according to a predetermined customized branched structure, and then the individual line elements are manually fixed to one another, for example, by banding.

DE 33 27 583 A1 discloses a partially automated process for the production of cable sets of individual conductors. In this method, first the required and prefabricated individual conductors cut to a predetermined length are releasably connected with each other by means of coupling pieces and are combined to form continuous lines, which are wound, for example, on a winding device.

Subsequently, the coupling pieces are released from the individual lines and in a further device, connector casings are attached to the ends and then, the harness is formed.

DE 38 20 638 C2 reveals a further automated method for producing a cable set. Here, prefabricated individual elements are inserted in connector casings with the aid of an industrial robot. The connector casings are mounted along a line on a vertically oriented laying board. The individual lines between two adjacent connector casings loosely hang down. Thereafter, a winding takes place, for which purpose the industrial robot makes a tool change. In one embodiment, the connector casings are arranged on turntables, which are movable along a linear guide. After fitting the connector casings, the turntables with the attached connector casings move to a predetermined position which corresponds to a predetermined position of the connector casing on the cable set.

SUMMARY OF THE INVENTION

Proceeding from this, the object of the invention is to provide a system and a method for the automated production of such cable sets with a branched structure.

The object is achieved according to the invention by a system for the automated production of a cable set with the features of claim 1. The invention is further achieved by a method for the automated production of such a cable set with the features of claim 22. The advantages and preferred embodiments mentioned with regard to the system are to be transferred analogously to the method as well.

The system is basically subdivided into a first part and a second part. The first part is used for the automated preparation and provision of the individual line elements. In the second part, the branched cable set is then assembled from the prepared individual line elements. All steps in the first part as well as in the second part take place fully automatically without manual intervention.

The first part has a modular set-up with several first processing stations. The first part includes several, preferably all, of the following first processing stations:

A cutting station in which line elements are deviated to the desired length. For this purpose, the continuous elements stored on a reel, in particular insulated conductors, are unwound and cut off.

A stripping station in which line ends of the line elements are stripped. The stripping station is integrated, for example, in the cutting station.

A contacting station in which contact elements are attached to the stripped line ends.

A buffer station where the line elements prepared at the previous processing stations are stored.

A first transport system with first transporters, by means of which the line elements are supplied individually to the individual first processing stations or transported between the individual first processing stations.

In particular, the first part comprises at least the first transport system, the buffer station and one of the further first processing stations, especially the contacting station. The line elements in the different prefabrication stages are respectively received by a first transporter between a respective first processing station, moved to the next first processing station and transferred there for a further processing step to a processing unit of a respective processing station. After carrying out the processing step, the line element is transferred again to the first transporter and transported further.

In the buffer station, a plurality of differently prepared line elements, which differ, for example, with regard to their length, their type (single insulated conductor or twisted pair of conductors) and/or their geometry (e.g., diameter, conductor cross section), are stored intermediately. The line elements are in particular insulated conductors or twisted conductors.

The second part of the system also has a modular set-up and exhibits several, preferably all, of the following second processing stations:

A connector station in which predetermined, prepared line elements are assembled, namely precisely the number and, as needed, the different types required for the cable set to be produced. For this purpose, a manipulator and movable second transporters are provided at the connector station. The second transporters are at least partially equipped with a connector casing or can be equipped therewith, wherein the connector casing is used to receive the contact elements of the prepared line elements.

If necessary, it is additionally preferably provided that a part of the second transporter is provided for receiving several line ends of line elements connected to one another in a material-liquid manner. In this case, the second part and in particular the connector station also has a connecting device for the material-liquid connection of the stripped line ends of a plurality of line elements. The material-liquid bonding takes place here for example by welding or soldering. The manipulator provided at the connector station is preferably designed as a handling robot, in particular a commercially available industrial robot, in particular a multi-axis articulated robot. The latter is used to insert the contact elements in a respective connector casing and/or to equip the second transporter with the fluidly connected ends. At the connector station, therefore, the prepared line elements required for the cable set are automatically selected and fitted with the required connector casings.

Subsequent to the connector station, a distribution station is arranged, at which the second transporters with the line elements/connector casings held thereon are distributed at least in a two-dimensional plane into a predetermined distribution structure. The distribution structure corresponds in particular to the branched structure of the cable set. Therefore, in the distribution station, the individual line ends of the line elements or the connector casings are moved to their end positions in accordance with the branched structure of the cable set with the aid of the second transporters. At the distribution station, therefore, the cable set is practically spread out, so that the individual line elements form the branched structure of the cable set.

Furthermore, a fixing station is provided, which is designed to fix the line elements together. Due to the previously made distribution, the line elements are fixed to each other by the fixation in the branched structure of the cable set.

Generally, a second transport system is formed in the second part, which is configured to move the second transporters between the individual processing stations. This second transport system is also used in particular for distributing the second transporters within the distribution station.

In this case, the second part comprises at least the second transport system, the distribution station and preferably at least the fixing station and/or the connector station.

With such a system, the fully automated production of a cable set with a branched structure is made possible in a simple manner and at the same time, process-reliably. Essential aspects are to be seen in the fact that the line elements are prepared in the first part, i.e., in particular, the contact elements are fastened, and the line elements are cut to the desired length. In this case, different types of line elements (in particular insulated conductors/insulated conductor pairs with different cross sections) are stored on reels. The prepared line elements are removed from the buffer station for the respective individual cable set and assembled at the connector station, and at the same time, the connector casings are equipped with the contact elements. Subsequently, the cable set is practically spread out at the distribution station and fixed in this spread-open position.

Furthermore, the modular set-up is of particular importance, since as a result an overall flexible structure of the entire system is achieved. The system can be individually configured and/or expanded due to the modular set-up.

In an expedient embodiment, the first processing stations and/or the individual second processing stations are arranged directly adjacent to each other, so that the line elements or each partially produced cable set can be rapidly and immediately transferred. In the second part, in each case the complete cable set (in the different production stages) is transferred between the second processing stations.

Preferably, the individual first and/or the individual second processing stations are each aligned vertically. This means that the line elements in the first part or the respectively partially produced cable set in the second part are transported in the vertical direction between the individual transport stations and are also processed, for example, in the vertical orientation. The line elements in the first part are therefore transported in each case hanging between the individual processing stations. In particular, they are also collected hanging in the buffer station. In the case of the second part, the individual line elements are spread into a two-dimensional laying structure within for example the distribution station, wherein said laying structure is formed within a plane that is vertically oriented.

To form a respective processing station, the latter has in each case a scaffolding in which, for example, the required processing units for processing, for example, the line elements, such as stripping, are arranged. Overall, the individual processing stations are therefore preferably formed shelf-like. The individual shelves or scaffoldings preferably follow each other directly. By means of this scaffolding structure, the desired modular set-up is achieved in a simple manner. Adjacent scaffoldings are in particular mechanically interconnected.

The scaffoldings of the first part are in each case preferably arranged linearly with one another along one direction. This facilitates in particular the transport of the individual line elements between the individual processing stations.

In addition, the scaffoldings of the second part are also linearly attached to each other. Preferably, all processing stations are arranged with their scaffoldings both of the first part and the second part linearly to each other, so that overall a linear scaffolding arrangement is formed. As a result, an automated production line is essentially obtained, which is modular and at the same time compact. The individual scaffoldings preferably each have the same depth.

Within the scaffolding, in particular of the first part, processing units or processing machines for carrying out the functions of the respective processing station are expediently arranged. In the case of the cutting station, this is a cutting machine, in the case of the stripping station, a stripping machine and in the case of the contacting station, for example, a crimping machine.

With regard to the automatic transport of the line elements in the first part, or the respectively partially produced cable set in the second part, the first and/or the second transport system are suitably formed. In particular, a first and/or second track system is formed with respective first and second tracks. Along these tracks, the first transporter and the second transporter are movable.

This track system with the first and second tracks is preferably arranged in each case on a front side of the scaffolding. In particular, in combination with the linear scaffolding arrangement, this results in an efficiently designed transport system for the conveyance of the individual line elements. The first tracks and/or the second tracks in this case run in particular horizontally on a front side of the respective scaffolding.

Expediently, each processing station is assigned a first track or a second track, i.e., fixed directly to the respective scaffolding of the respective workstation. The tracks of adjacent processing stations are aligned with one another, so that a transfer of the first or second transporters between adjacent processing stations is made possible. By assigning the individual tracks to the individual processing stations, the modular set-up is maintained. A respective processing station therefore comprises a part of the track system. A system can therefore be easily custom configured. The tracks of adjacent processing stations are typically mechanically interconnected.

Conveniently, the first track system has a circumferential guide track, which is composed in particular of the first tracks and other deflecting elements. Along these guide tracks, the first transporters are circumferentially movable within the first part of the system. In particular, they can be moved along the guide track from the cutting station to the buffer station and back. A respective first transporter therefore moves continuously starting from the cutting station to the individual first processing stations and continuously to the buffer station, where the prefabricated line element held in the transporter is then transferred to the buffer station. Subsequently, the respective first transporter is returned again along a returning part of the circumferential guide track.

The second track system preferably has a plurality of mutually parallel second tracks, which are mutually free in the vertical direction, i.e., independent of one another, and are adjustable as a function of the predetermined branched structure of the cable set. By means of this measure, a spreading apart in the vertical direction is achieved by a vertical adjustment of the second tracks to which in each case second transporters are attached. The additional movability of the second transporters along the tracks results in the possibility that the second transporters are distributed to the desired distribution structure in two dimensions.

Conveniently, a plurality of the second processing stations each have a plurality of these second tracks that are freely adjustable in the vertical direction to each other. The second tracks of adjacent second processing stations are in each case aligned with each other. In addition, the second transporters are controlled in operation such that they are transferred in the predetermined distribution structure between adjacent second processing stations. The spread out cable set is therefore transferred by this measure in this spread-out shape through the individual processing stations. Maintaining the spread-out distribution structure, in particular in the fixing station, enables and maintains the fixing of the line elements to one another in the desired distribution structure and thus in the branched structure of the cable set. This transfer in the branched structure takes place in particular between the distribution station and the immediately following fixing stations and preferably up to an end station at which the cable set is then prepared, for example, for shipping/packaging.

Similar to the first transport system, a circumferential track system is also formed in the second transport system, so that the second transporters can initially be successively moved between the individual successive second processing stations and then returned to a starting point. For this purpose, in particular a common return track is arranged in the second transport system. This is returned from the last second processing station to the first second processing station, which is embodied in particular by the connector station.

The moving of the individual transporters is preferably done individually and independently. This means that each of the transporters, particularly the second and/or the first transporters, are controlled individually and individually moved. They are movable in particular in the manner of carriages along the tracks. The individual transporters are preferably not (mechanically) coupled to each other. For this individual movability, the transporters are electrically or magnetically driven. In particular, they each have their own drive unit. In the case of a magnetic drive, this drive unit consists in the simplest case of a permanent magnet or of an electromagnet. Magnets are then distributed along the tracks, in particular electromagnets. By an appropriate polarity reversal, a continuous magnetic field is then generated, which drives the transporters.

For the handling of the cable set in the different processing stations in the second part of the system, several manipulators are provided in this second part. These are movable along a front side or a rear side of the processing stations, i.e., along a front side or rear side of the scaffolding. These manipulators are—as already explained in connection with the connector station—robots, in particular industrial robots, specifically multi-axis articulated robots. These typically have adjustment possibilities in several degrees of freedom, in particular in a plurality of degrees of linear freedom as well as in a plurality of degrees of rotational freedom. These manipulators are movable, for example, along a guide device, such as guide tracks. This guide device is optionally arranged on the ground in front of the individual scaffoldings or on the ceiling. Preferably, a ceiling mount is provided so that the manipulators can be moved hanging on the front or rear side of the individual scaffoldings in the longitudinal or expansion direction of the system. By using the manipulators, more complex tasks can also be performed at the respective processing stations. In addition, the manipulators can also be individually configured to meet different needs.

Expediently, for each processing station at which a manipulator is required, a separate manipulator configured for said processing station is disposed. This results in an independent processing within the respective processing station and thus achieves a high clock rate.

In a preferred development, the last second processing station is designed as a collecting station at which the second transporters are collected. After the final assembly of the cable set, for example, this is removed by the individual second transporters at a packaging station. These are therefore free again and are first collected at the collecting station and then transported from there via the aforementioned common return track back to the connector station. In particular, a plurality of vertically movable second tracks are arranged at the collecting station, which receive the respective second transporters distributed in the vertical direction. These second tracks of the collecting station are then guided to the height of the common return track and there, the second transporters are transferred to the common return track.

The fixing station generally has aids with which the individual line elements are fixed to each other. The fixing station serves in particular to surround the bundle of the line elements with a partially enclosing casing, as applicable. In principle, there are different options for the fixing station. Accordingly, the fixing station comprises a suitable processing unit. In particular, the fixing station has a casing unit, in particular a spraying unit, a banding unit, and/or a casting unit. Depending on the requirements, one or more or even all of these aforementioned units may be formed at the fixing station. Conveniently, a respective processing unit is held on a respective manipulator and is individually brought via the latter to a respective required processing position on the cable set. The individual processing units attached to the manipulators therefore form substations of the fixing station. A respective substation preferably has its own scaffolding.

The casing unit, especially the spray unit, is used for applying, in particular spraying, a fixing agent, by means of which the individual line elements are fixed together. The fixing agent is, for example, liquid, aerosol-like and in particular designed as an adhesive. Specifically, the spray unit is designed for spraying a particular fixing agent, as described for example in WO 2016/026711 A1.

The banding unit is generally used for applying a banding and the casting unit is used for applying a casting compound to the line elements to be connected. For example, an assembly station can be used to apply the banding, as known from WO 2015/055753 A1.

In a casting unit, in particular mold halves are formed, which are placed around the respective part of the cable set with the plurality of line elements that are to be overmolded and then, a casting compound is introduced. All this again takes place fully automatically, in particular with the help of the manipulators.

Preferably, the individual fixing means, i.e., the sprayed fixing agent, the banding or the casting compound are attached via the individual processing units only at local locations of the cable set to be produced. Specifically, these fixatives are applied to branch positions where individual line elements branch off.

In addition, the second part of the system expediently also has a clip station which serves for fixing individual clips. Here, clips are generally fixers by means of which the finished cable set is fixed or fastened to a support structure, such as the motor vehicle body. These are usually fixed on the cable set at desired defined positions by means of a banding. As a processing unit, the clip station preferably comprises the assembly station disclosed in WO 2015/055753 A1. This in turn is preferably attached to a manipulator.

Conveniently, the entire system is supplemented by a warehouse, in particular a high-bay warehouse, which is designed to provide different reels having different types of individual elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
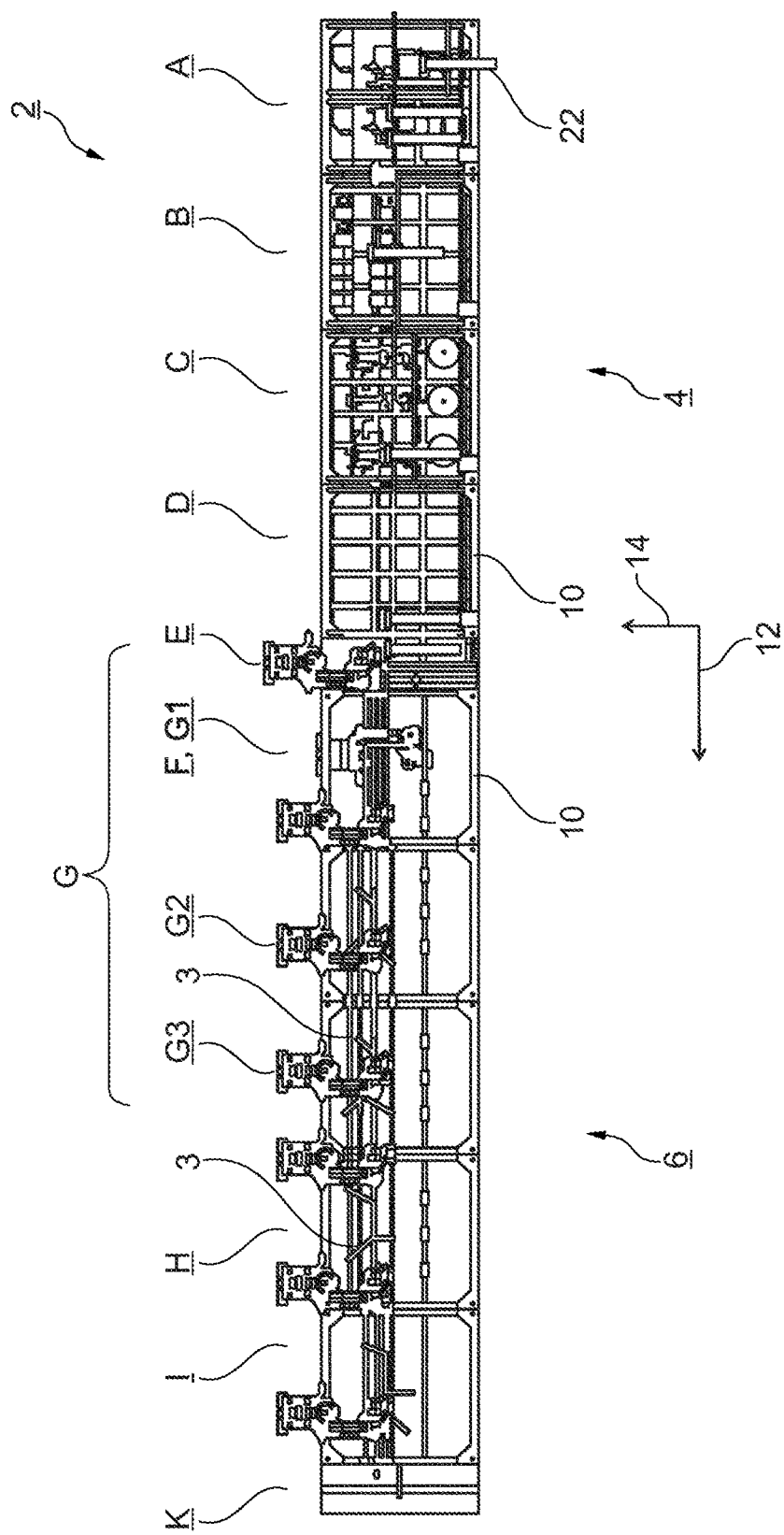
FIG. 1 a front view of a system for the automated production of a cable set with a first and a second part, FIG. 2 a partial perspective view of the system in the area of the first part together with a warehouse, FIG. 3 a partial perspective view of the system in the area of the second part, FIG. 4A an enlarged partial view in the area of a cutting station with an integrated stripping station of the first part, with a partial representation of a first transport system for handling individual line elements, FIG. 4B an enlarged partial view for clarifying the handling of the individual line elements by means of the first transport system, FIG. 5A-5C detailed views in the area of the cutting station for clarifying an automated cutting to length of the individual line elements, FIG. 6 a partial enlarged view in the area of a stripping station for clarifying the automatic stripping of the line elements, FIG. 7 an enlarged partial view preferably also in the area of the stripping station for clarifying the mounting of a (sealing) hose on the line element, FIG. 8 a partial enlarged view in the area of a contacting station for clarifying the mounting of contact elements on the stripped wire ends, FIG. 9a-9D different partial views in the area of a buffer station, which serves for the intermediate storage of the prepared line elements, together with the second transport system for clarifying the transport and the transfer of the individual line elements to the buffer station, FIG. 10 a partial view in the area of a connector station of the second part of the system, FIG. 11 a partial view in the area of a distribution station and a fixing station connected thereto, FIG. 12 a partial enlarged view of a casing unit of the fixing station specifically formed as a spray unit for applying a fixing agent, FIG. 13 a partial enlarged view of a banding unit of the fixing station for attaching a banding, FIG. 14 a partial enlarged view of a casting unit of the fixing station for applying a casting compound to the line elements, FIG. 15 a partial enlarged view of the second part in the area of a collecting station, FIG. 16 a view of a rear side in the area of the beginning of the second part in the area of the connector station with a manipulator for equipping the second transporter with connector casings.

In the figures, identically-acting parts are provided with the same reference numerals.

Figure 2:
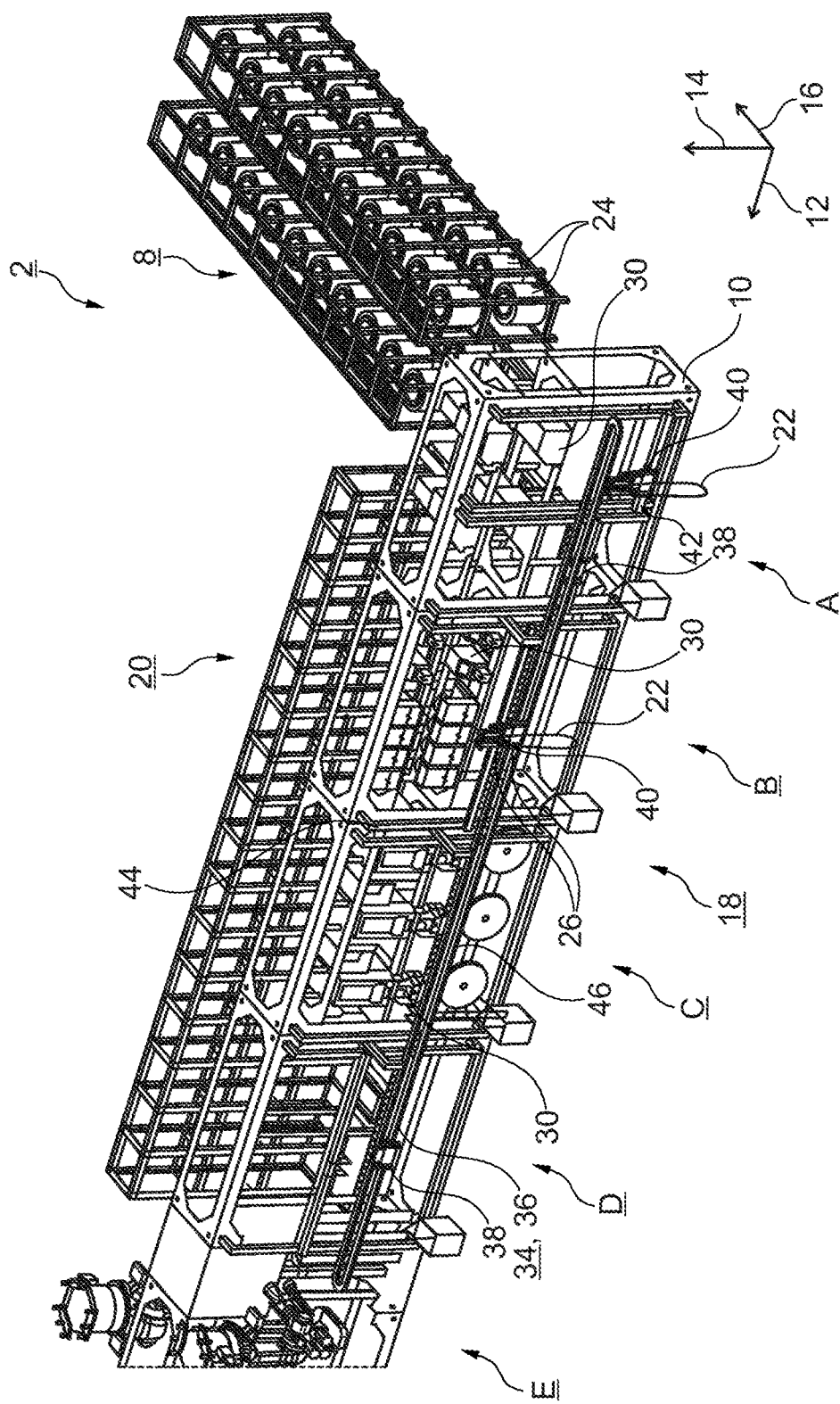
Figure 3:
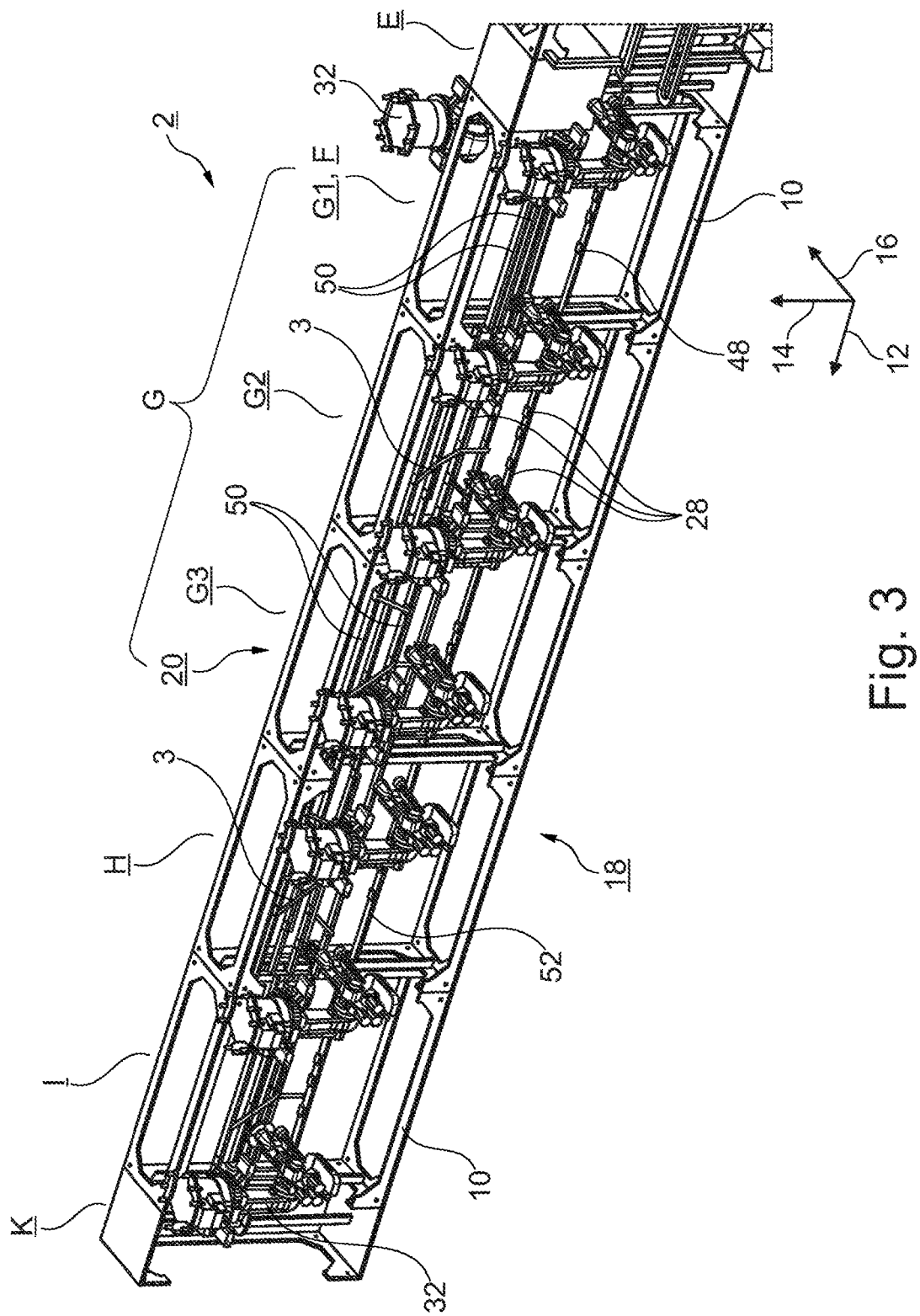

The system 2 shown in FIGS. 1 to 3 serves for the automated production of a cable set 3 and is set up modularly from a plurality of individual processing stations. The system has a first part 4 with first processing stations A, B, C, D and a second part with second processing stations E, F, G, H, I, K. Upstream of the first part 4, a warehouse 8 is also disposed, which is designed in the manner of a high-bay warehouse. The individual processing stations A to K each have a scaffolding 10, which essentially defines a scaffolding frame within which processing units for carrying out different work steps are arranged in the first part 4.

The scaffoldings 10 are attached directly adjacent to each other and form a particular linearly extending scaffolding arrangement. The scaffoldings 10 are lined up in a longitudinal direction 12 to each other. The scaffoldings 10 are set up in the manner of a shelf. They extend in height in a vertical direction 14 and have a depth extending in a transverse direction 16. The longitudinal direction 12 and the vertical direction 14 span a vertical plane, to which the transverse direction 16 is oriented vertically. In the exemplary embodiment, the warehouse 8 is arranged to extend in the transverse direction 16. As a result of the orientation of the scaffoldings 10 in the vertical orientation, the entire scaffolding arrangement has a front side 18 and a rear side 20.

In the production of the cable set 3, the system 2 is run through in the longitudinal direction 12 from the first processing station A, successively to the last processing station L. In the exemplary embodiment of the illustrated modular system 2, the following processing stations are provided:

A cutting station A, a stripping station B, a contacting station C, a buffer station D. The second part 6 starts with a connector station E, followed by a distribution station F, a multipart fixing station G, which in the exemplary embodiment has three substations G1, G2, G3, further followed by a clip station H, a packaging station I and an end or collection station K.

In the first part 4 of the system 2, first line elements 22 are prepared. These are in particular insulated conductors or twisted conductors. They are provided by the meter via reels 24. The reels 24 are stored in the warehouse 8.

In the second part 6, the individual prepared line elements 22 are assembled to the cable set 3. All of this is fully automated without manual intervention. The line elements 22 in the individual prefabrication stages are conveyed further within the first part 4 in each case between the individual first processing stations A to D by means of a first transport system 26.

In the second part 6, in which the assembly of the cable set 3 from the individual line elements 22 takes place, the respective cable sets in their different prefabrication stages are successively fed to the individual processing stations E to J of the second part 6 by means of a second transport system 28.

The individual processing steps in the first part 4 are carried out with the aid of processing units 30, which are arranged within the respective scaffolding 10 of the respective first processing station A to D.

In the second part 6, the individual steps required are performed by manipulators 32, which are designed in the embodiment as multi-axis articulated arm robots. In this case, each individual processing station E to I is assigned its own manipulator 32. The individual manipulators 32 are arranged to be movable in the longitudinal direction 12. In the exemplary embodiment, they are attached hanging from a ceiling track not shown here.

As will be described later, for the production of the cable set 3 in the second part 6, the cable set 3 is spread out in keeping with a desired later branched structure. The cable set 3 is therefore spread in a two-dimensional plane. The latter is vertically aligned, i.e., it lies in the vertical plane described above. The cable sets 3 are arranged on a front side of the scaffolding 10. The processing therefore takes place on the front side 18 of the scaffolding 10 by means of the manipulators 32.

In the automated production of the cable set 3, the following manufacturing steps are successively and automatically run through in the system 2 shown in the embodiment:

Warehouse

In the warehouse 8, a plurality of reels 24 are stored, on which line elements 22 of different types are wound up as continuous stock. The individual types of the line elements 22 differ in particular with regard to their cross sections, in particular the cross sections of the conductors, the color of the conductor insulation or also by whether it is a single insulated conductor or in particular a twisted conductor pair. The line elements 22 not yet cut to length, for example, are unwound directly from the reel 24 located in the warehouse 8 and fed to the cutting station A. Alternatively, it is also possible to move a respective required reel 24 from the warehouse 8, for example, to the rear side 20 of the cutting station A and to unwind the line elements 22 from there.

A Cutting Station

Within the cutting station A, the line elements 22 of different types unwound from the reels 24 are cut to length according to the length required for the respective cable set 3 to be produced. For this purpose, the processing units 30 disposed in the cutting station A are formed as commercially available cutting units.

B Stripping Station

In the stripping station B, line ends of the line elements 22 are subsequently stripped by means of appropriate stripping units as processing units 30.

In addition, it is preferably further provided that additionally, a sealing hose is attached in the area of the stripped line end. Said sealing hose serves to seal the respective line element 22 against a connector casing.

C Contacting Station

In the contacting station C, contact elements, for example contact bushings or contact pins, are fixed to ends of the exposed line ends, i.e., to the respective conductor of the line element 22. This is done, for example, by a crimping process. For this purpose, corresponding contacting units, in particular crimping machines, are arranged in the contacting station C as processing units 30.

D Buffer Station

The previously prepared line elements 22 are collected in the buffer station D. In the buffer station D, therefore, in the manner of an intermediate storage, there are a plurality of line elements 22 which differ in terms of their type and/or their length.

First Transport System 26

The first transport system 26 serves in each case for transporting the line elements 22 between the individual processing stations A to D. It has a first track system 34. This comprises a circumferential guide track 36, on which individual, individually movable first transporters 38 are arranged. These first transporters 38 are carrier units which can be moved in the manner of carriages along the guide track 36. These are each formed in particular for the hanging reception of one or more line elements. Hanging reception is understood here to mean that the line elements 22 are moved by means of the first transport system 26 hanging between the individual workstations A to D. The transfer from or to a respective processing station A to D to these first transporters 38 takes place with the aid of positioning units 40. Each processing station A to D is assigned at least one positioning unit 40. The positioning unit 40 is in turn arranged to be movable in the longitudinal direction 12 on the front side 18 of the respective scaffolding 10. The positioning unit 40 typically has a plurality of degrees of freedom of movement such that the line elements 22 hanging from the first transporters 38 are gripped and fed to the individual processing units 30. Usually, the actual processing of the line elements 22 takes place in the horizontal direction. The line elements 22 are fed, for example, to the processing units 30 in the transverse direction 16 for stripping or contacting. The positioning unit 40 is generally designed such that it, in particular, grips the line ends of the line elements 22 and transfers them from an orientation in the vertical direction 14 into an orientation in the transverse direction 16 and feeds them to the processing units 30. After carrying out the respective processing step, the positioning unit 40 again transfers the processed line element 22 to a respective first transporter 38, so that the line element 22 is again hanging therefrom and moved to the subsequent processing station.

The individual first transporters 38 are each individually movable and controllable. Specifically, they are driven by a magnetic drive, wherein for this purpose, a plurality of electromagnets are preferably arranged on the guide track 36, the first transporter 38 specifically at the same time has permanent magnets, and by a changing polarity reversal of the electromagnets, a wandering magnetic field is produced in the guide track 36 for propelling the first transporter 38.

At the end of the first part 4, i.e., after transferring the line elements 22 to the buffer station D, the first transporters 38 are returned to a front track part of the circumferential guide track 36. The entire first track system 34 is attached to the front side 18 of the scaffolding 10. The guide track 36 extends in the longitudinal direction 12 and is aligned horizontally. The positioning unit 40 is expediently likewise arranged so as to be movable along a transverse track 42. As a result, the positioning unit 40 can be moved in the longitudinal direction 12 within the respective processing station A to D. In addition, vertical movability of the positioning unit 40 is provided. For this purpose, in the exemplary embodiment, the respective transverse track 42 itself is movable along lateral vertical tracks 44 in the vertical direction 14. This makes it possible that within a respective scaffolding 10, a plurality of processing units 30 are arranged distributed over both the length and the height, which can each individually be approached via the positioning unit 40. For the positioning unit 40, too, an individual drive is preferably provided, which preferably likewise is driven by electromagnetic means, as in the case of the first transporters 38.

The first track system 34 is generally composed of a plurality of first tracks 46. Specifically, the circumferential guide track 36 is formed of a plurality of these first tracks 46 (plus deflecting elements). A respective first track 46 is associated with a respective scaffolding 10 and in particular has its length. So as to correspond to the scaffolding arrangement, the first track system 34 also has a modular set-up. The first tracks 46 of adjacent processing stations are aligned with each other to form the circumferential guide track.

E Connector Station

In the connector station E, second transporters 48 of the second transport system 28 are equipped with the line elements 22. At least a part of the second transporters 48 is equipped with connector casings for this purpose. In these, the contact elements attached to the line ends of the line elements 22 are inserted. Some of the second transporters 48 may also be provided or equipped with holders for receiving interconnected line ends of two line elements 22. Finally, some of the second transporters are formed or equipped with corresponding deflecting elements or holders for guiding or deflecting line elements 22.

In some cases, it is necessary for two line ends to be connected directly to each other so as to bring the two line elements 22 to the same potential. This is typically done by a material-liquid connection of the two line ends. For this purpose—for example, integrated in the connector station E—a corresponding connection unit is arranged as a processing unit (not shown in detail). For example, with the help of the manipulator 32, the line ends to be connected are inserted into a welding unit (ultrasonic welding). Subsequently, it is preferable to insulate these fluidly connected line ends, for example, by shrink-fitting a shrink tube or by applying an insulating material, for example, by spraying, etc. In the connector station E, these fluidly connected line ends are then also introduced in the aforementioned holders on the second transporters 48.

Of particular importance within the connector station E is further that the second transporters 48 are distributed to multiple second tracks 50 of the second transport system 28. The second tracks 50 are arranged in parallel with each other. The individual line ends of the line elements 22 are fixed in a suitable manner to a respective second transporter 48, which second transporters are arranged distributed over the second tracks 50. In this case, in the connector station E, all the line elements 22 required for the cable set 3 to be produced are removed from the buffer station D and fixed to the second transporters 48. This is done with the aid of the manipulator 32 assigned to the connector station E.

The connector station E is a comparatively narrow station. Thereon, the second transporters 48 are preferably each arranged close to each other. The mutually parallel second tracks 50 are preferably arranged directly next to one another.

F Distribution Station

The second transporters 48 equipped with the line elements 22 are transferred to further second tracks 50 in the distribution station F. In the distribution station F, the second transporters 48 and thus the line ends of the line elements 22 are distributed in the branched structure specified by the cable set 3. The individual second transporters 48 therefore assume within the vertical plane a distribution structure corresponding to the branched structure of the cable set 3. For this purpose, the second transporters 48 are moved on their respective second track 50 in the longitudinal direction 12 to a predefined position. At the same time, the mutually parallel second tracks 50 are pulled apart in the vertical direction 14, resulting in the desired branched structure. In the illustration of FIG. 3, an intermediate situation is also shown, in which the complete distribution structure has not yet been occupied within the distribution station F. The distribution structure can be seen at the following processing stations.

The spreading of the second tracks 50 and the moving of the second transporters 48 in the longitudinal direction to its predetermined longitudinal position need not necessarily be completed in the distribution station F. This can also be done, for example, at least partially in the subsequent fixing station G.

G Fixing Station

In the fixing station G, the individual line elements are fixed to each other, in particular to fix the predetermined branched structure, i.e., to provide a certain stability. For this purpose, a plurality of substations G1, G2, G3 are expediently provided, which are designed, for example, for different types of fixing methods. Thus, the different fixing methods can be used as needed for a respective cable set 3. For example, a first fixing station G1 is configured for spraying a particular textile fixing agent, a second fixing station G2 is configured for applying a banding and a third fixing station G3 is configured for applying a casting compound.

For these different variations, the processing stations G1, G2, G3 each have their own manipulators 32, which are equipped with corresponding handling units.

As can be seen with reference to FIGS. 1, 3, the distribution station F and the first fixing station G1 are combined with one another, and therefore jointly share a scaffolding 10.

H Clip Station

If required, (fixing) clips are attached in the clip station. These are typically fixed to the cable set 3 by means of banding. For this purpose, also, a suitable clip placement unit is attached to the respective manipulator 32.

I Packaging Station

The packaging station I is used to remove the finished cable set 3 and for further transport of the same. For this purpose, the cable set 3 is removed from the second tracks 50 with the aid of the associated manipulator 32. Different options are available for further transport, for example, simple storage on a table, on a conveyor belt, etc. Alternatively, the loading of the cable sets 3 onto transport containers. Generally, there is also the possibility that the cable sets 3 are folded together for compact transport.

K Collecting Station

At the collecting station K, the individual second transporters 48 are collected and fed to a common return track 52. The latter runs along the rear side 20 and extends up to the connector station E. At said connector station, with the aid of a manipulator 32 disposed on the rear side 20, the second transporters 48 are again equipped in a suitable manner with connector casings and thus prepared for the production of the next cable set 3.

Second Transport System 28

The second transport system 28 includes the previously described second tracks 50 and second transporters 48. Similar to the first transporters 38, the second transporters 48 are arranged in the manner of carriages movable along the tracks 50. The individual second transporters 48 are individually movable and, like the first transporters 38, preferably also have an electromagnetic drive system. The second tracks 50 are each movable in the vertical direction 40. Each processing station E to I in this case has a number of second tracks 50, which are arranged in parallel with each other. The second tracks 50 each extend only over the length of a respective scaffolding 10 of a respective processing station E to I. For the transfer of the second transporters 48 between adjacent processing stations, the second tracks 50 are brought into an aligned arrangement.

Furthermore, the second transport system 28 includes the common return track 52, which runs along the rear side 20.

The individual processing steps at the individual processing stations A to K will be explained in more detail below with reference to FIGS. 4 to 15.

Figure 4A:
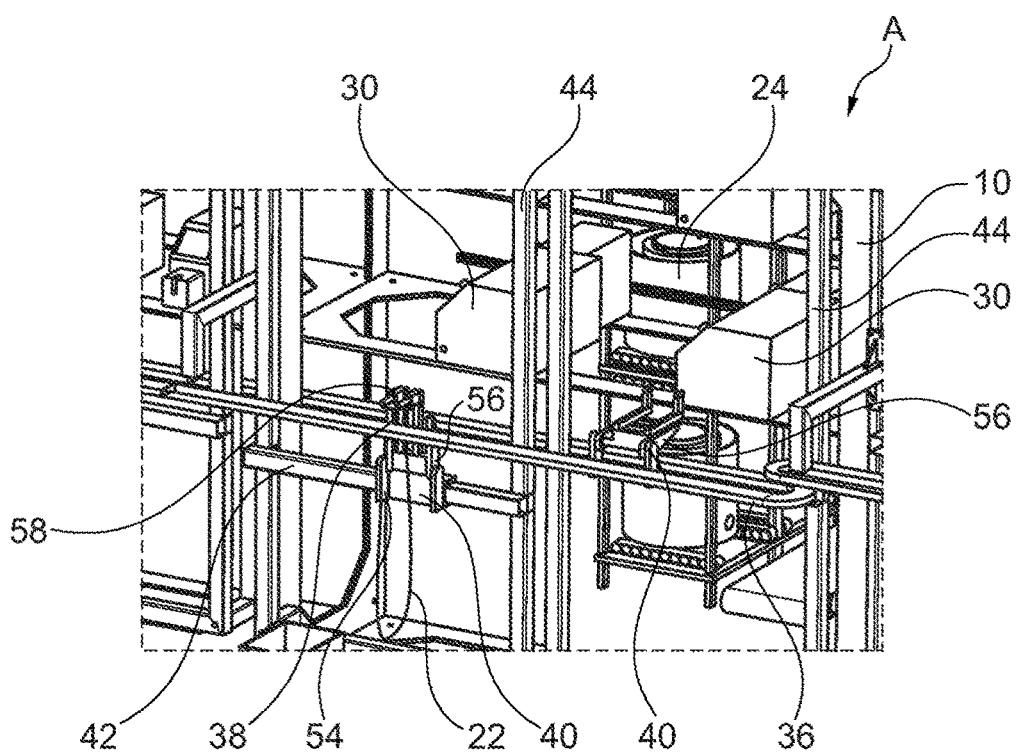

FIG. 4A shows an enlarged view of the front side 18, specifically in the area of the cutting station A. The view into the interior of the scaffolding 10 can be seen, where several processing units 30 are shown by way of example. In the background, the reels 24 of the warehouse 8 can also be seen. The transfer mechanism for transferring the line elements 22 to the respective processing station from the first transporter 38 with the aid of the positioning unit 40 will be explained with reference to FIGS. 4A and 4B.

FIG. 4A initially shows the circumferential guide track 36. This runs in front of the scaffolding 10. Between the guide track 36 and the scaffolding 10, the transverse track 42 is additionally arranged, which is mounted longitudinally displaceable on the vertical tracks 44.

The positioning unit 40 has a base 54 guided on the transverse track 42, to which in the exemplary embodiment a pivotable pivot arm 56, which is pivotable about a horizontal axis oriented parallel to the longitudinal direction 12, is fixed. On this in turn, a positioning gripper 58 is arranged—in the embodiment, two positioning grippers 58 are arranged—which are designed for gripping a respective line element 22.

Two grippers 60, which are likewise designed to hold the line elements 22, are likewise arranged on the first transporter 38 at the same distance as the positioning grippers 58 are to each other. As can be seen in particular from FIG. 4B, the respective line element 22 is held hanging in the first transporter 38, wherein the two grippers 60 grip the two line ends of the line element 22 so that it forms a U-shaped arc. The transfer situation is shown by way of example in FIG. 4B. The respective line end extends beyond the gripper 60 by a certain degree. By means of the respective positioning gripper 58, which is preferably formed at its front end in the manner of a U-bracket or C-bracket (see enlarged schematic view in FIG. 4B), a portion of the line element 22 is then gripped above and below the gripper 60. The gripping takes place in particular by, for example, suitably designed clamping jaws which are operated, for example, via actuators (for example electrically). After receiving the line element 22 in the positioning grippers 58, the positioning unit 40 moves to the desired processing unit 30. For this purpose, the positioning unit 40 can be moved both in the vertical direction 14 and in the longitudinal direction 12. To transfer the ends of the line element 22 into the respective processing unit 30, the pivot arm 56 pivots by approximately 90°, so that the line ends are transferred from their vertical orientation into a horizontal orientation.

Figure 4B:
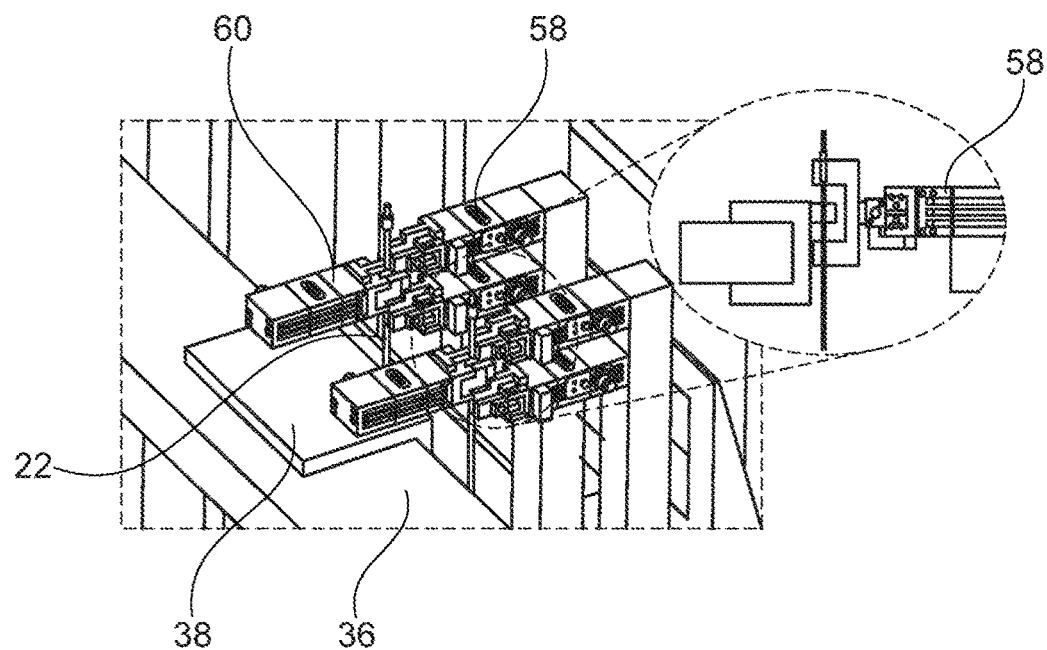

As can be seen from FIG. 4A and from FIG. 4B, the positioning grippers 58 are in each case approximately L-shaped. The one L-leg is attached to the pivot arm 56. Conveniently, this L-leg is preferably extendable in its longitudinal direction in the manner of a telescope. In this way, therefore, a feed movement can be made, for example in the transverse direction 16, when the pivot arm 56 is pivoted in the horizontal plane. This makes it possible to introduce the line ends gripped by the positioning gripper 58 in the transverse direction 16 into the respective processing unit 30.

A respective positioning gripper 58 and/or a respective gripper 60 is/are preferably designed for gripping both a single conductor and for separately gripping two insulated conductors of a conductor pair.

Figure 5A:
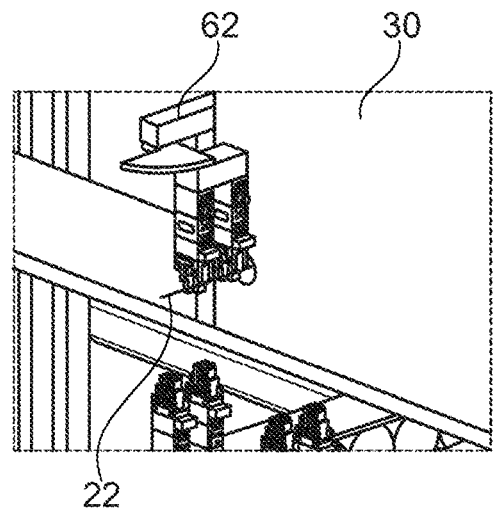
Figure 5B:
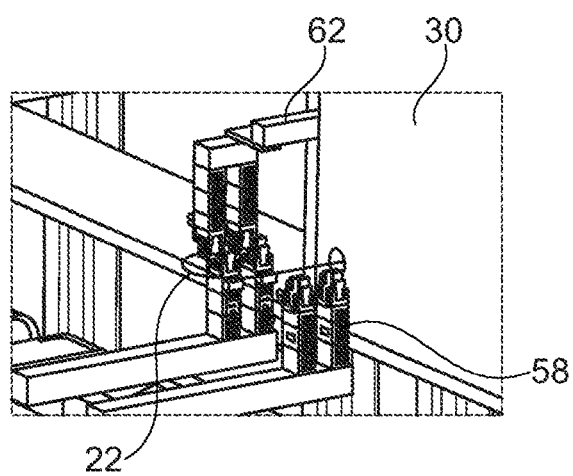
Figure 5C:
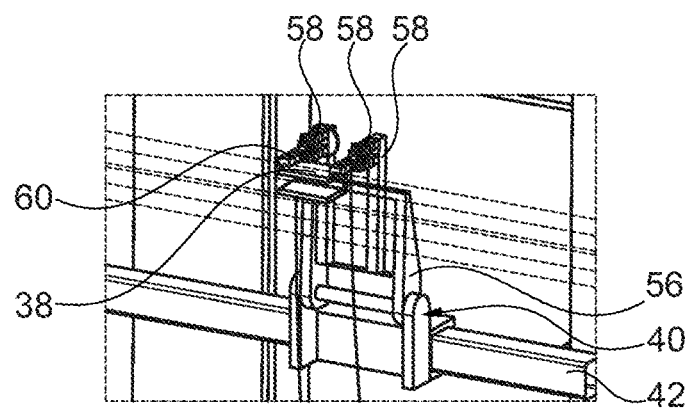

The cutting of the line elements 22 to length in the cutting station A will be explained with reference to FIGS. 5A to 5C:

The processing unit 30 also has a gripping element 62 for gripping a line end of the not yet cut-to-length line element 22. This line end protrudes from a cutting station and is gripped by the gripping element 62 and withdrawn by being pulling from the reel 24, which cannot be seen here. The gripping element 62, as can be seen by comparing FIGS. 5A and 5B, can be pivoted by 180° about a vertical axis. The line end is gripped, then the gripping element 62 is rotated by 180° about the vertical axis, followed by a transfer to the positioning gripper 58 of the positioning unit 40 located at this position (left). By pivoting 180°, the line end is guided along a circular arc, wherein the diameter of this circular arc corresponds to the distance between the positioning grippers 58. By this measure, therefore, the gripping element 62 can be transferred to the left positioning gripper 58. At the same time, after the line element 22 has been cut to length, the then second line end can be gripped directly by the right positioning gripper 58 without the need for additional moving. In order to provide the correct length for the line element 22, a conveying element for pushing out the line element 22 is included, for example, in the cutting station 30.

Figure 6:
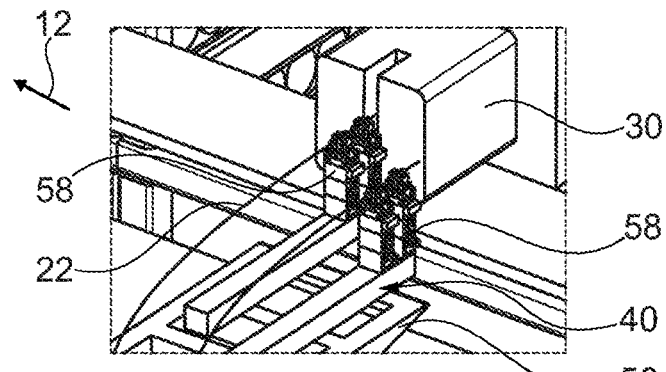

FIG. 6 shows a situation when the line ends are being stripped. The positioning unit 40 with the two positioning grippers 58, which hold the line element 22 at the two ends, can again be seen. The processing unit 30 is designed here as a stripping unit. The pivot arm 56 is pivoted back into the horizontal plane. By means of initially the left positioning gripper 58 and by a linear feed movement of the L-leg, the line end is inserted into the stripping unit 30, stripped there and then withdrawn. Subsequently, the same procedure is carried out with the aid of the right positioning gripper 58. For this purpose, the positioning unit 40 moves a distance in the longitudinal direction 12, so that the second line end is oriented in a defined position relative to the cutting unit 30.

Figure 7:
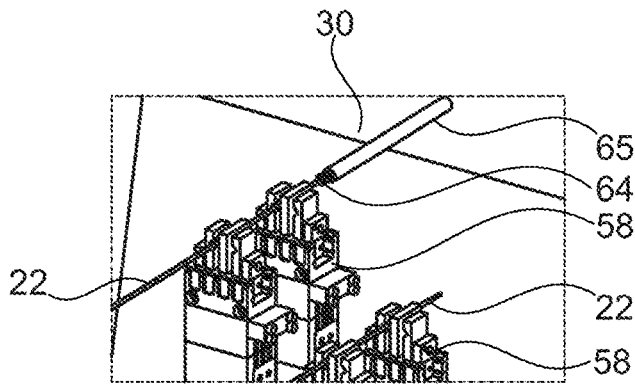

After stripping, a seal 64 is additionally further attached to the stripped end of the line, as shown in FIG. 7. The seal is designed in the manner of an O-ring or sleeve. The principle is in turn similar to the stripping in FIG. 6. Again, the line ends are inserted by means of the linear positioning movement of the positioning grippers 58. On the side of the processing unit 30, the seals 64 are each provided and held in a tube 65 at a defined position. The tube 65 forms a feed for the sealing element 64. The line end is inserted into the tube 65 and thereby, the sealing element 64 is pushed onto the line end.

Figure 8:
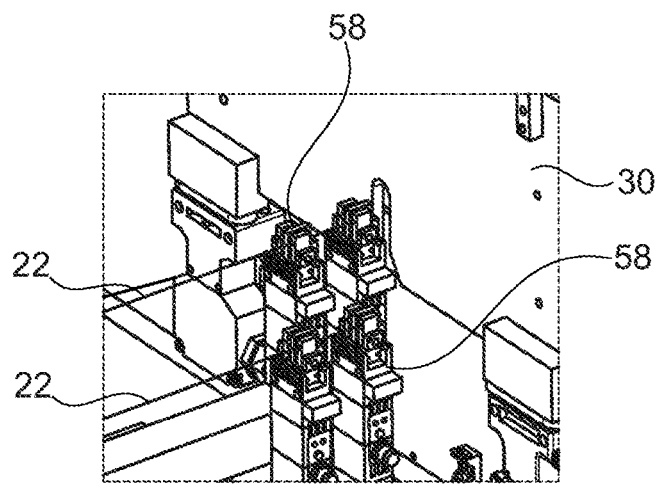

Next, in the contacting station C, a contact element, which cannot be seen in FIG. 8, is attached. The processing unit 30 is formed in this case, for example, as a crimping unit, which provides crimping contacts. The stripped line end is in turn introduced by means of the positioning gripper 58 into the processing unit 30, where the crimping process or the attachment of the contact element takes place.

Figure 9A:
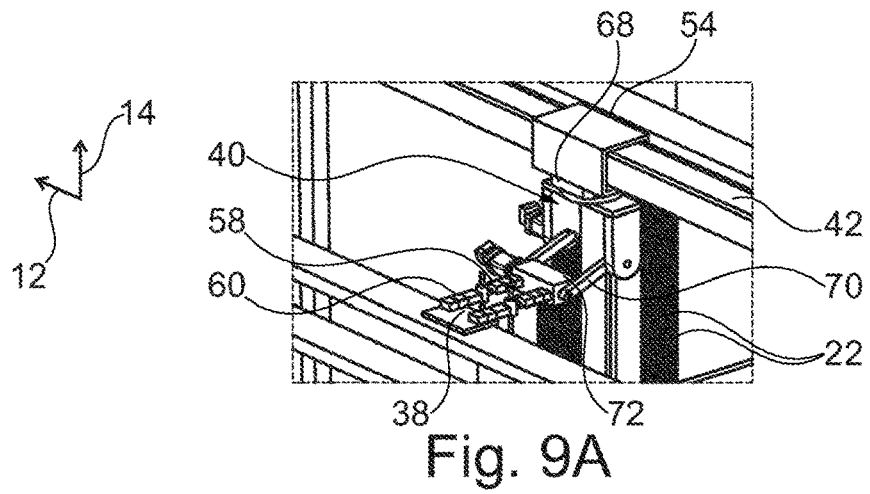
Figure 9B:
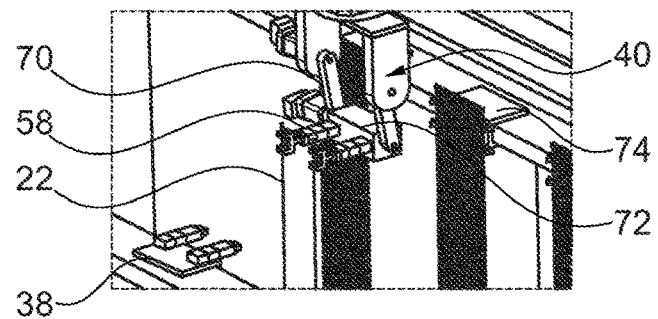
Figure 9C:
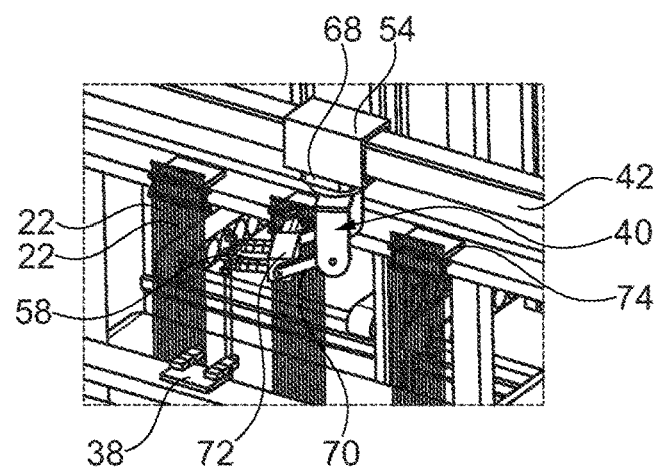
Figure 9D:
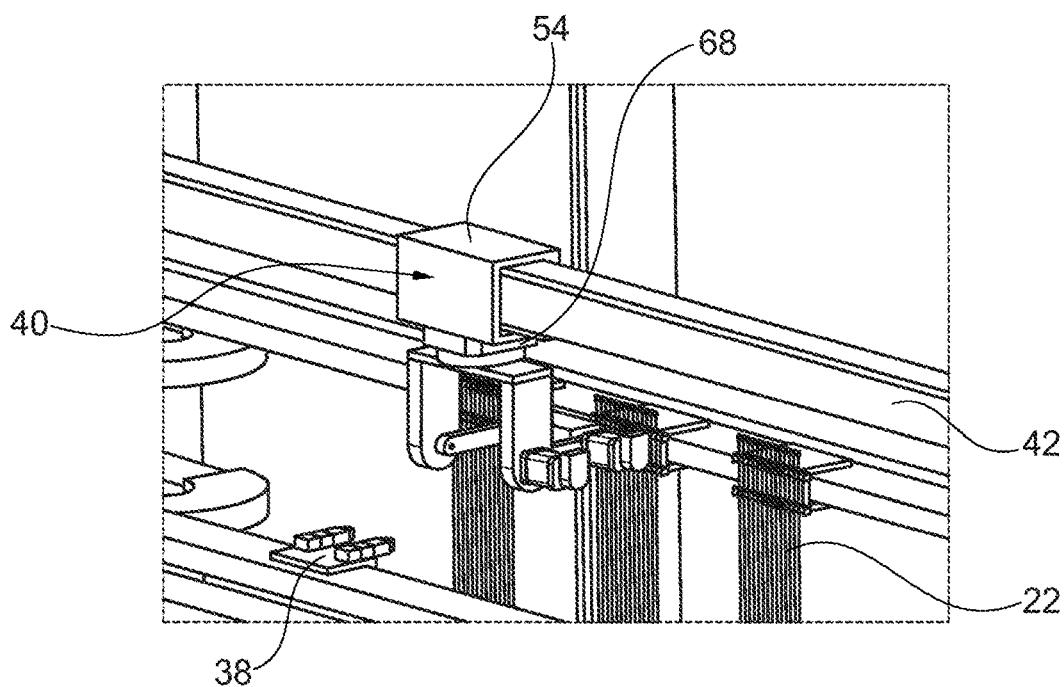
Figure 10:
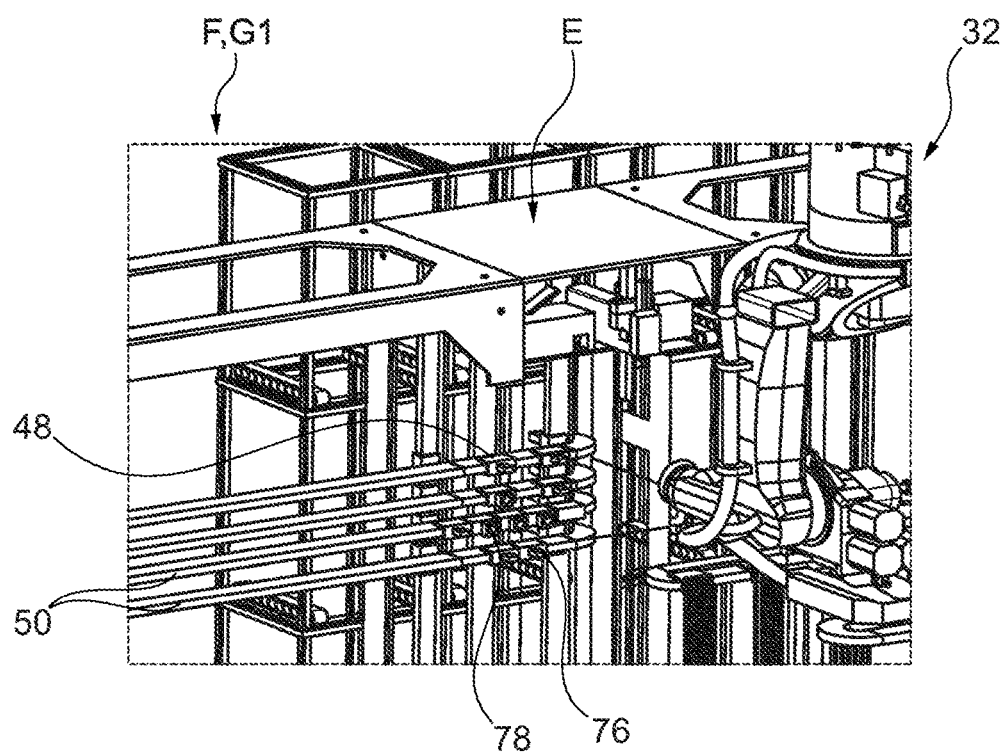
Figure 11:
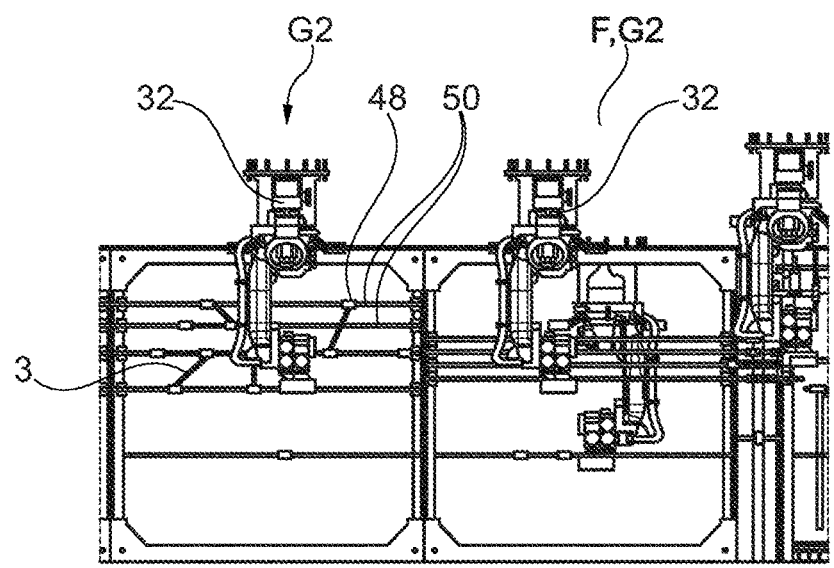

After attaching the contact elements, the line element 22 is prepared for the production of the cable set 3 and is brought into the buffer station D. This situation is illustrated by way of example in FIGS. 9A to 9D. At the buffer station D, in turn a positioning unit 40 is arranged, which in turn is movable in the longitudinal direction 12 and in the vertical direction 14. In turn, said positioning unit is transversely displaceable on the transverse track 42 by means of an individual drive. The transverse track 42 is movable along lateral vertical tracks 44 in the vertical direction. The positioning unit 40 in the buffer station D, in turn, preferably has two positioning grippers 58, which grip the line ends of the line element 22. The transfer from the respective grippers 60 of the first transporter 38 is shown in FIG. 9A. In the embodiment variant according to FIGS. 9A to 9D, the positioning unit 40 has a carriage-like base 54, on which a rotary holder 68 is rotatably arranged about a vertical axis. In the exemplary embodiment, the rotary holder 68 is formed U-shaped and has two U-legs. In general, pivot levers 70 are arranged to pivot about a longitudinal axis on the rotary holder 68; the pivot levers 70 in turn carry at their other end a base body 72, to which the two positioning grippers 58 are fixed. The base body 72 is in turn pivotally mounted on the pivot levers 70. By a pivoting of the pivot levers 70, a feed movement to the first transporter 38 takes place toward or away from it. The rotary holder 68 can rotate at least 180°. After receiving the line element 22, this is transferred by a 180° rotation from the first transporter 38 to a collecting holder 74 by means of the positioning unit 40.

From the buffer station D, the individual line elements 22 are gripped by means of the manipulator 32 of the connector station E and the line ends of a line element 22 are fixed to two separate second transporters 48.

In this case, the second transporters 48 are preferably equipped with suitable connector casings 76. The line ends are reliably inserted in this connector casing 76. For example, during insertion, a suitable position and/or force monitoring is provided to ensure process-reliable, dependable equipping of the connector casing 76 with the line ends of the line elements 22 and thus with the positionally accurate arrangement of the contact elements. Within the connector station E, all line elements 22 required for the cable set 3 are successively removed from the buffer station D and connected into the connector casing 76 with their line ends. Furthermore, a part of the second transporter 48 is equipped, for example, with deflecting elements 78, and at least some of the line elements 22 are fixed to these deflecting elements 78 at defined longitudinal positions.

The individual second tracks 50 are arranged close to each other.

From the connector station E, the second transporters 48 with the line elements 22 held thereon are then transferred to the subsequent processing station, in particular the distribution station F. The individual second transporters 48 then move to different longitudinal positions on their respective second track 50. In addition, the second tracks 50 are pulled apart within the distribution station F, so that by this measure the second transporters 48 as a whole are arranged distributed according to a predetermined distribution structure at different positions within a vertical plane. This can be seen in particular, for example, in the left half of FIG. 11. This left half shows a substation of the fixing station G. In the exemplary embodiment, two steps are being taken in parallel at the distribution station F, namely, on the one hand, the distribution and transfer of the second transporters into the distribution structure. Parallel to this, at the same time, a first fixing takes place. That is, a substation G1 of the fixing station G is combined with the distribution station F. The fixing takes place by means of the manipulator 32.

Figure 12:
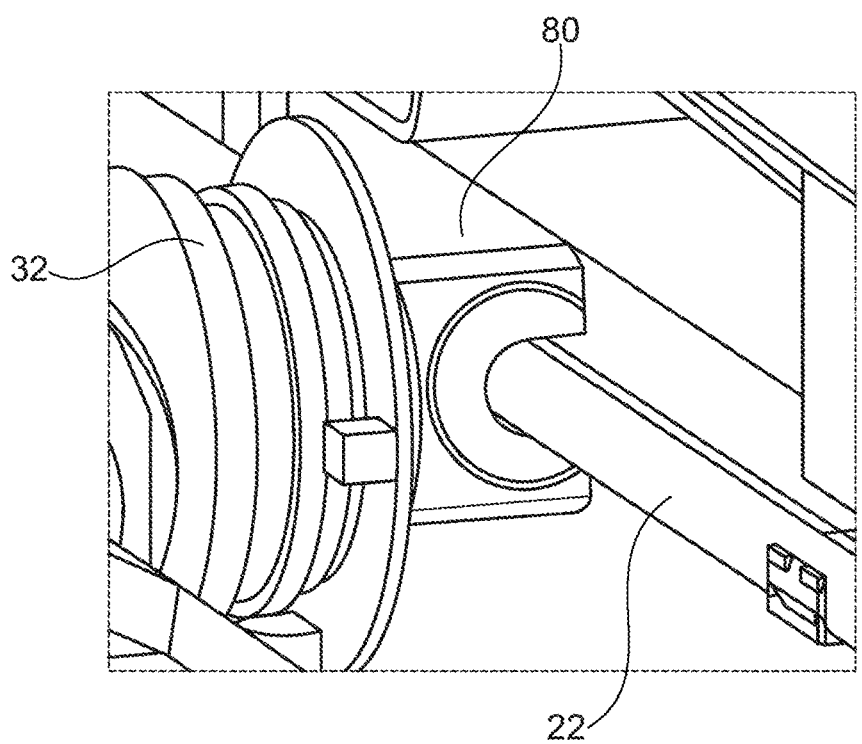
Figure 13:
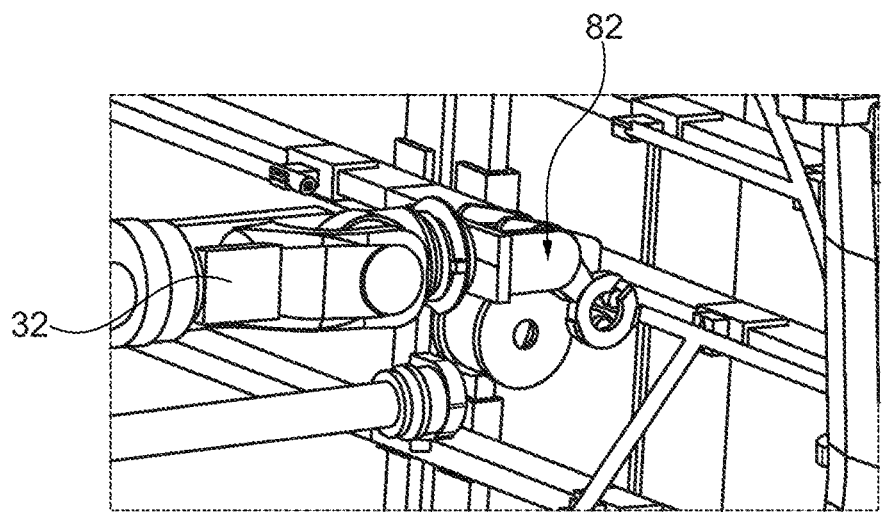
Figure 14:
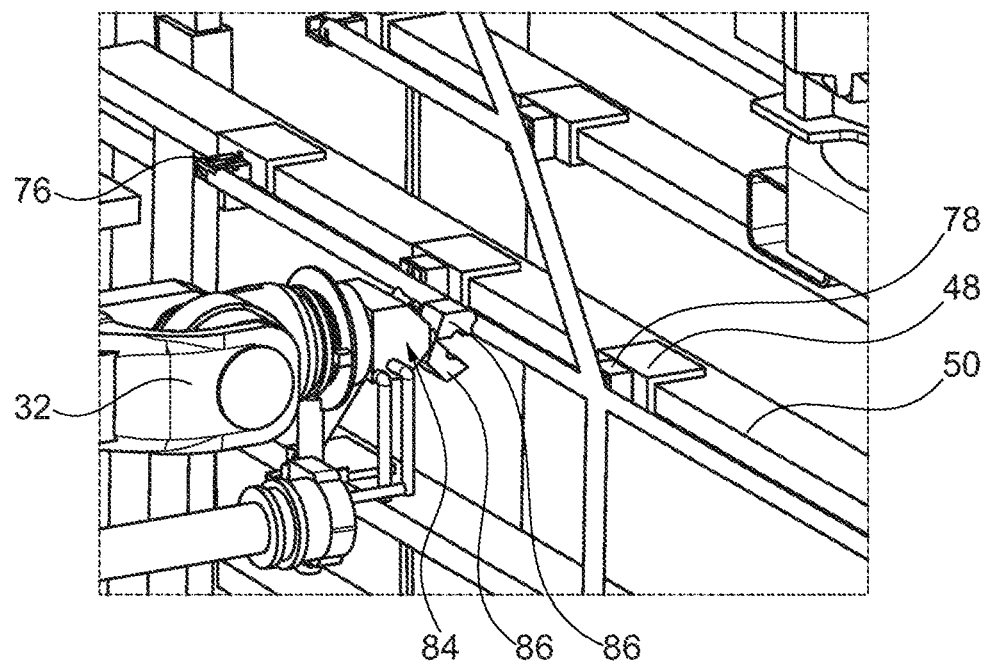

FIGS. 12, 13, 14 each show partial representations in the area of the substations G1, G2, G3 of the fixing station G. FIG. 12 shows a casing unit designed as a spray unit 80 for applying a fixing agent, as described, for example, in WO 2016/026711 A1. For example, a different adhesive is applied, in particular sprayed on. The application can also be carried out otherwise, for example by dipping.

For this purpose, the spray unit 80 is arranged on a robot hand of the manipulator 32, which spray unit encloses the combined line elements 22, for example in a C-shape, and can be moved up to said line elements radially. Within the spray unit 80, individual spray heads are included, over which the fixing agent is sprayed.

FIG. 13 shows a banding unit 82 by means of which banding is applied. Specifically, the banding is presently attached to the line bundle for fastening clips not shown here. The clips are in particular designed as fixing elements, via which the finished cable set 3 is later attached to components, for example in the vehicle. The banding material is stored, for example, on a reel and is wound by this around the line elements 22 to be joined together by means of a banding head. The banding head is again formed approximately C-shaped, so that it can be guided laterally over the line bundle. Preferably, the clips to be fixed are also simultaneously fed automatically. The banding head is in particular identical to or designed on the basis of the assembly unit disclosed in WO 2015/055753 A1.

FIG. 14 shows a casting unit 84, which in turn is arranged on the robot hand of the manipulator 32. The casting unit 84 has two mold halves 86 which are designed to be foldable so that they can be placed over the wire bundle. After closing the two mold halves 86, a preferably fast-curing casting compound is introduced into the mold 56. The casting compound is fed to the mold halves 86 via a supply system.

Specifically, in FIG. 14, the second transporters 48 are easily recognizable, in particular together with the deflecting elements 78 or also the connector casings 76. The deflecting elements 78 are arranged in particular in the area of branches, where at least one line element 22 branches off from the remaining strand of the line elements 22.

Figure 15:
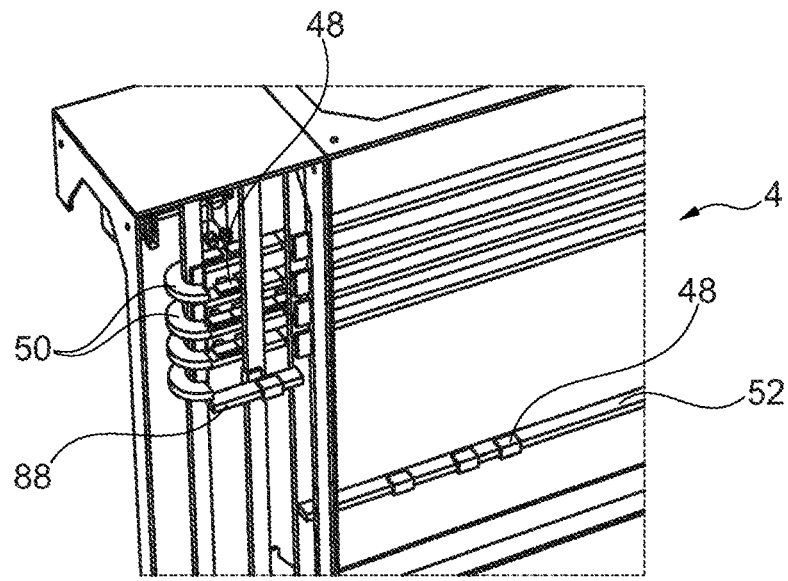

FIG. 15 shows a partial enlarged view of the last station, namely the collecting station K, with a view of the rear side 20. After the finished cable set 3 has been removed from the individual second transporters 48 in the packaging station I, these are again free to be newly equipped. In the collecting station K, these transporters are brought to the common return track 52 by the individual second tracks 50 arranged distributed in the vertical direction 14 and via these, are again moved in the direction of the connector station E. As can be seen from FIG. 15, the collecting station K likewise has a plurality of second tracks which contain a 180° deflecting element. Via at least one rear transverse track 88, the second transporters 48 are received by the individual second tracks 50 and moved in the vertical direction 14 to the common return track 52 and transferred to them.

Figure 16:
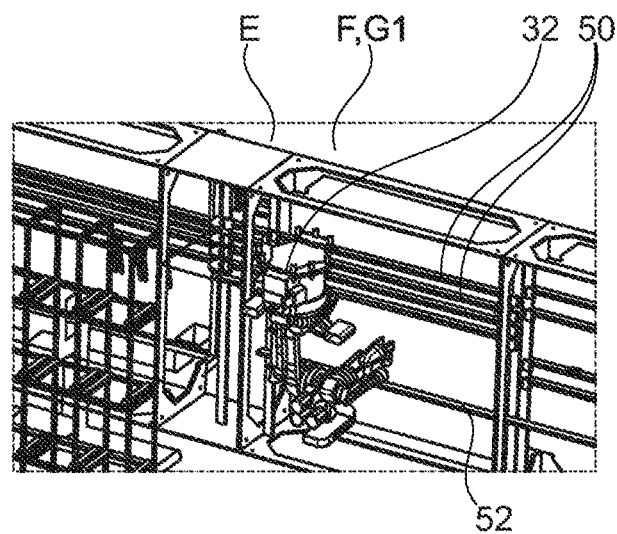

The returned second transporters 48 are re-equipped with the connector casings 76 and/or the deflecting elements 78 in the area of the connector station E. This takes place—as can be seen from FIG. 16, in particular on the rear side 20 with the aid of a manipulator 32.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for automated production of a cable set, which has a branched structure and a plurality of individual line elements, the system comprising:
   a first part of the system for automated preparation of the individual line elements;
   a second part of the system for automatically producing the cable set from the line elements of the first part of the system,
   wherein, in a modular set-up, the first part having at least two of the following first processing stations:
      a cutting machine that cuts the line elements to length from a reel;
      a stripping machine for stripping line-ends of the line elements, wherein the stripping machine and the cutting machine are integrated;
      a crimping machine for attaching contact elements to the line-ends stripped by the stripping machine; and
      a buffer station for temporarily storing a plurality of differently prepared line elements, wherein the prepared line elements are collected in the buffer station,
   the first part including a first transport system with first transporters for individually feeding the line elements to the first processing stations and for transporting the line elements between the first processing stations, wherein the first transport system has a first track system with at least one first track,
   wherein first transporters are movable along the at least one first track, and
   wherein the first track system has a guide track of the at least one first track along which the first transporters are movable within the first part of the system,
   wherein, in the modular set-up, the second part comprises the following second processing stations:
      a connector station for assembling prepared line elements of a cable set from the first part of the system, wherein the connector station includes a manipulator and second transporters which provide a connector casing for receiving the contact elements of the prepared line elements, wherein the manipulator inserts the contact elements into a respective connector casing,
      a distribution station arranged following the connector station for distributing the second transporters with the line elements held thereon into a predetermined distribution structure according to the branched structure of the cable set, wherein the connector casings are moved by the second transporters to their end positions in accordance with the branched structure of the cable set, so that the cable set is spread out in a two-dimensional plane with the individual line elements connecting to and branching from a main line of the individual line elements, and
      a second transport system for moving the second transporters between the individual second processing stations, wherein the second transport system comprises a second track system with multiple second tracks, wherein the second transporters are movable along the second tracks, wherein the second track system is formed so that the second transporters are successively moved consecutively between the second processing stations.

2. The system according to claim 1, wherein each of the first processing stations are directly adjacent to each other and each of the second processing stations are directly adjacent to each other.

3. The system according to claim 1, wherein the first processing stations are aligned vertically or the second processing stations are aligned vertically.

4. The system according to claim 1, wherein each of the first processing stations have scaffolding and each of the second processing stations have scaffolding.

5. The system according to claim 4, wherein the scaffoldings of the first processing stations and the second processing stations are linearly attached to each other.

6. The system according to claim 5, wherein the cutting machine, the stripping machine, the crimping machine, and the buffer station are arranged within the scaffolding of the first processing stations.

7. The system according to claim 4, wherein the first tracks are arranged on a front side of the scaffolding of the first processing stations and the second tracks are arranged on a front side of the scaffolding of the second processing stations.

8. The system according to claim 1, wherein at least one second track of the second tracks and the at least one first track pass through each of the first processing stations and each of the second processing stations, and
   wherein the at least one first track and the at least one second track of adjacent processing stations are aligned, so a transfer of the first and second transporters between adjacent processing stations of the first processing stations and the second processing stations is made possible.

9. The system according to claim 1, wherein the second tracks of the second track system are mutually parallel and are movable perpendicular to a longitudinal direction of the second tracks independently of one another and as a function of the branched structure of the cable set.

10. The system according to claim 1, wherein the second tracks of the second processing stations are each mutually freely adjustable tracks,
wherein the second tracks of the second processing stations each align with each other, and
wherein the second transporters are controlled in operation such that the second transporters are transferred in the predetermined distribution structure between the second processing stations.

11. The system according to claim 1, wherein a common return track is arranged from the last second processing station to the connector station and returns the second transporters.

12. The system according to claim 1, wherein the second transporters are automatically individually movable.

13. The system according to claim 1, wherein the second transporters are electrically or magnetically driven.

14. The system according to claim 1, wherein for the second part of the system, a plurality of manipulators are provided, which are movable along a front side or rear side of the second processing stations.

15. The system according to claim 14, wherein each processing station of the second processing stations associated with a manipulator of the plurality of manipulators has a corresponding manipulator.

16. The system according to claim 1, wherein the second part of the system further has a collecting station, at which the second transporters are collected.

17. The system according to claim 1, wherein the second part of the system further has a clip station for fixing clips.

18. The system according to claim 1, wherein upstream of the first part of the system, a warehouse is arranged for providing different reels with different types of individual line elements and the different reels are automatically fed to the cutting station.

19. A method for the automated production of the cable set by the system according to claim 1, wherein the cable set has the branched structure and the individual line elements, the method comprising:

automatically preparing, in the first part of the system, the individual line elements at the first processing stations; and
automatically generating in the second part of the system, the cable set from the line elements prepared in the first part of the system,
wherein the first part of the system automatically performs at least two of the following:
cutting the line elements to length from the reel;
stripping the line-ends of the line elements;
attaching contact elements to the stripped line-ends;
storing the prepared line elements intermediately; and
moving the line elements individually between the first processing stations with the first transport system with the first transporters,
wherein the second part of the system performs:
at a connector station, assembling the line elements of the cable set, wherein the connector casings are mounted on the second transporters, wherein the second transporters with the line elements held thereon are then moved into a predetermined distribution structure according to the branched structure of the cable set, or and wherein the line elements are fixed to each other.

20. The system according to claim 1, wherein the at least one first track forms an elongated oval loop, the guide track being provided along a circumference of the elongated oval loop, the first transporters traveling along the guide track or the at least one first track, or
wherein the second tracks form a loop such that the second transporters return on a common track to a beginning of the second part of the system.

21. The system according to claim 1, the second part further comprising:
at least one fixing-manipulator for fixing the line elements to each other.

22. The system according to claim 21, wherein the at least one fixing manipulator comprises:
a spray unit for spraying a textile fixing agent onto the line elements to be connected;
a banding unit for applying a banding to the line elements to be connected; or
a casting unit for applying a casting compound to the line elements to be connected.

* * * * *